US012795556B2

(12) United States Patent
Chuang et al.

(10) Patent No.: US 12,795,556 B2
(45) Date of Patent: Nov. 10, 2026

(54) SYSTEMS, METHODS, AND DEVICES FOR TEMPERATURE MANAGEMENT IN WIRELESS DEVICES

(71) Applicant: Cypress Semiconductor Corporation, San Jose, CA (US)

(72) Inventors: Wei-Kai Chuang, Taipei (TW); HuiKuang Tseng, Yunlin (TW)

(73) Assignee: Cypress Semiconductor Corporation, San Jose, CA (US)

( * ) Notice: Subject to any disclaimer, the term of this patent is extended or adjusted under 35 U.S.C. 154(b) by 332 days.

(21) Appl. No.: 18/429,712

(22) Filed: Feb. 1, 2024

(65) Prior Publication Data

US 2025/0254634 A1 Aug. 7, 2025

(51) Int. Cl.

*H04W 52/36* (2009.01)
*H04W 52/52* (2009.01)
*H04W 72/51* (2023.01)

(52) U.S. Cl.

CPC ........... *H04W 52/36* (2013.01); *H04W 52/52* (2013.01); *H04W 72/51* (2023.01)

(58) Field of Classification Search

CPC ...... H04W 52/36; H04W 52/52; H04W 72/51
See application file for complete search history.

(56) References Cited

U.S. PATENT DOCUMENTS

2008/0025341 A1* 1/2008 Rao ........................ H04W 72/51 370/468
2021/0168838 A1* 6/2021 Kothiwale .......... H04W 72/569
2023/0141784 A1* 5/2023 Kim .................... H04W 52/367 455/522
2025/0212140 A1* 6/2025 Lee ....................... H04W 52/38

* cited by examiner

*Primary Examiner* — Timothy X Pham

(57) ABSTRACT

Systems, methods, and devices provide temperature management in wireless devices. Methods include comparing, using a processing device, a measured temperature of a component of a wireless device with a designated temperature value, and determining, using the processing device, if a transmission parameter of the wireless device should be adjusted, the determining comprising determining that the measured temperature is a designated difference from the designated temperature value. Methods further include identifying, using the processing device, an adjustment to be made to the transmission parameter in response to determining that a transmission parameter should be adjusted, and adjusting, using the processing device, the transmission parameter of one or more transmission operations of the wireless device based on the identified adjustment.

20 Claims, 6 Drawing Sheets

SYSTEMS, METHODS, AND DEVICES FOR TEMPERATURE MANAGEMENT IN WIRELESS DEVICES

TECHNICAL FIELD

This disclosure relates to wireless devices, and more specifically, to enhancement of temperature control in such wireless devices.

BACKGROUND

Wireless devices may be configured to support various wireless communications operations. Accordingly, wireless devices may include components, such as transceivers configured to send and receive data. Such wireless devices may be implemented in a variety of operational contexts that have different environmental parameters, such as ambient temperature. Moreover, the wireless devices themselves may have operational constraints, such as a maximum permissible operational temperature. Conventional techniques for temperature management of such wireless device remains limited because they are not able to quickly and efficiently converge on target operational temperatures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include components, such as transceivers, that are configured to transmit and receive data in accordance with various communications protocols. Components included within such wireless devices may have operational characteristics, such as power efficiency and fault tolerance, that are temperature dependent. For example, relatively high operational temperatures may result in inefficient power consumption and eventually failure of components of the wireless device. Conventional techniques for contending with such operational temperature constraints remain limited because they are not able to efficiently converge on a target temperature.

Embodiments disclosed herein provide the ability to dynamically modify operational parameters of wireless devices to manage their operational temperatures and to converge on a target temperature. In some embodiments, operational parameters may include parameters underlying data transmission operations. For example, a duty cycle may be modified dynamically and based on temperature measurements to manage an operational temperature of a wireless device. In various embodiments, a modification of a single percent of a duty cycle may change an operational temperature of a chip included in a wireless device by one degree Celsius. Accordingly, modifications and adjustments to the duty cycle may be used to effectively and efficiently modify the operational temperature of the chip.

As will be discussed in greater detail below, increases and decreases in transmission duty cycles may be applied to increase and decrease the operational temperature of the wireless device, thus allowing convergence upon a target temperature, and the maintaining of that target temperature. Moreover, as will also be discussed in greater detail below, multiple adjustment modes may be used to improve the speed and efficacy with which convergence is achieved. For example, such modes may support larger changes when a temperature difference is larger, and smaller changes with a temperature difference is smaller.

Figure 1:
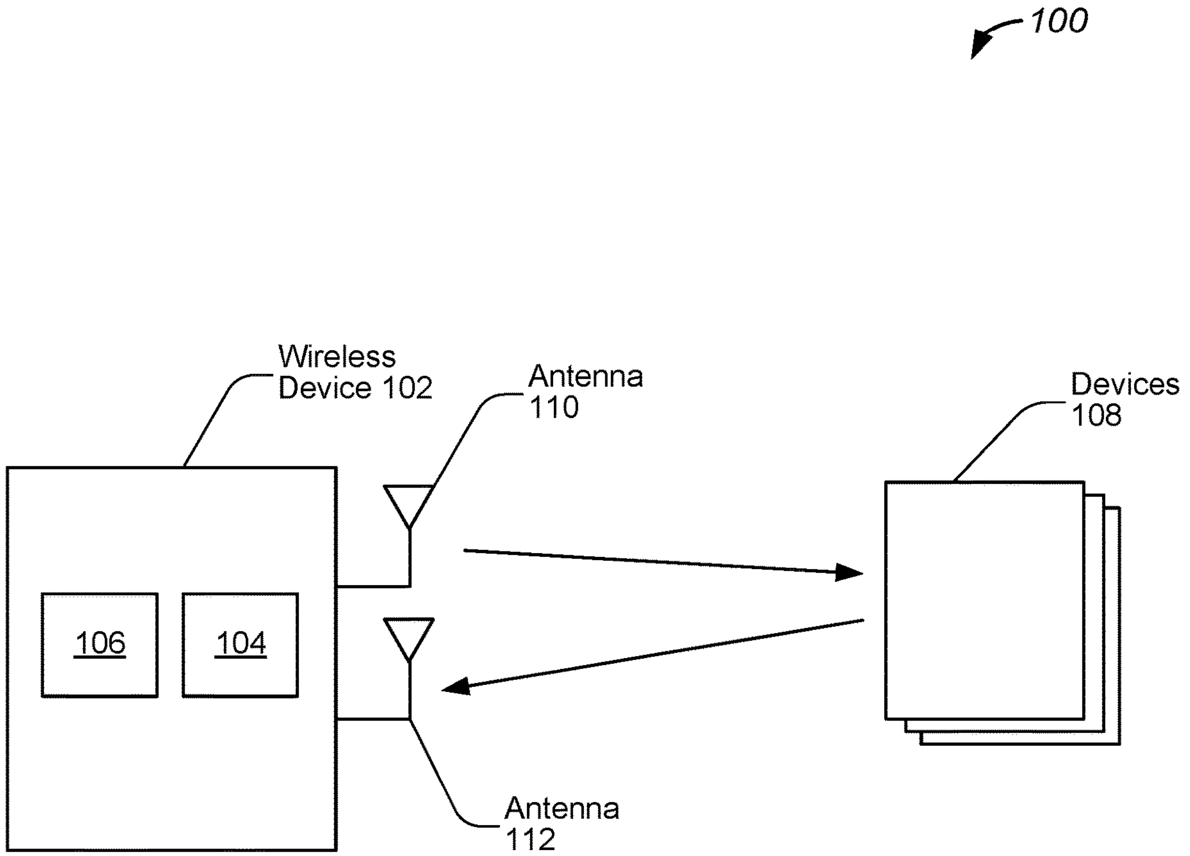
FIG. 1 illustrates an example of a temperature management system, configured in accordance with some embodiments.

FIG. 1 illustrates an example of a temperature management system, configured in accordance with some embodiments. Accordingly, a system, such as system 100, may include wireless devices that are used for wireless communications, and are also configured to be able to perform temperature management operations as disclosed herein. Accordingly, as will be discussed in greater detail below, wireless devices included in system 100 may be configured to obtain temperature measurements and dynamically implement modifications to manage an operational temperature of components of system 100.

In various embodiments, system 100 may include wireless device 102 which may be a wireless communications device. As discussed above, such wireless devices may be compatible with one or more wireless protocols, such as a Wi-Fi protocol. In some embodiments, wireless device 102 includes a wireless transceiver. For example, wireless device 102 may include a Wi-Fi transceiver that has access to a communications medium. More specifically, wireless device 102 may include transceiver 104 that is compatible with a Wi-Fi specification and protocol. In various embodiments, wireless device 102 may be included in an operational environment that experiences relatively high ambient temperatures. For example, wireless device 102 may be included in a portion of an automobile. In one example, wireless device 102 may be implemented as part of a head unit of an infotainment system of the automobile. In another example, wireless device 102 may be implemented in one or more other portions of the automobile, such as an engine compartment.

As shown in FIG. 1, various wireless communications devices may be in communication with each other via one or more wireless communications mediums. Moreover, wireless device 102 may include one or more antennas, such as antenna 110 and antenna 112, and may also include processing device 106. As disclosed herein, a transceiver may also have associated transmit and receive chains and processing logic. As will be discussed in greater detail below, such processing devices and transceivers may be configured to establish communications connections with other devices and to transmit data in the form of data packets via such communications connections and in accordance with a wireless protocol. Accordingly, wireless devices, such as wireless device 102, are configured to transmit data in accordance with a wireless protocol and using various transmission parameters which may include, for example, a duty cycle. As will be discussed in greater detail below, processing device 106 may be configured to dynamically modify a duty cycle used for transmission to modify power consumption and heat dissipation of transmission operations, and as a result of such modifications to the duty cycle, modify an operational temperature of one or more components of wireless device 102 based on their different transmission behavior and power consumption.

In some embodiments, system 100 may further include devices 108 which may also be wireless devices. As similarly discussed above, devices 108 may be compatible with one or more wireless transmission protocols, such as a Wi-Fi protocol. In some embodiments, devices 108 may be configured as stations in communication with wireless device 102 where wireless device 102 may be configured as an access point. For example, devices 108 may be smart devices or other devices, such as those found in smart phones and gaming systems that may be in communication with an infotainment system of an automobile. In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections.

Figure 2:
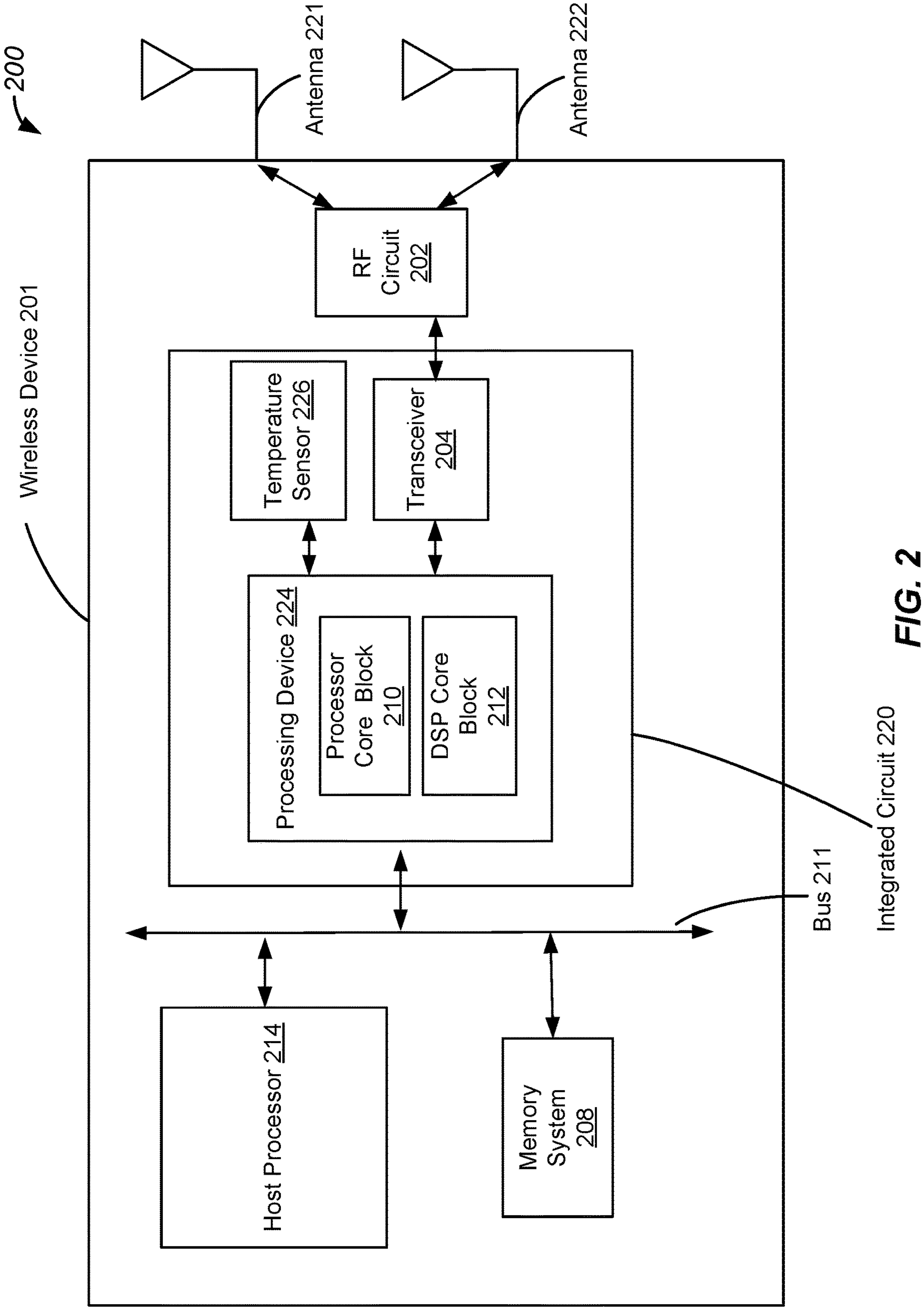
FIG. 2 illustrates an example of a device for temperature management, configured in accordance with some embodiments.

FIG. 2 illustrates an example of a device for temperature management, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102 and devices 108.

In various embodiments, wireless device 201 includes a transceiver, such as transceiver 204. In one example, transceiver 204 is configured to transmit and receive signals using a communications medium that may include antenna 221 and/or antenna 222. As noted above, transceiver 204 may be a Wi-Fi transceiver. Accordingly, transceiver 204 may be compatible with a Wi-Fi communications protocol, such as an 802.11ax protocol, an 802.11be protocol, an 802.11bn protocol, or any other suitable version of Wi-Fi. In various embodiments, transceiver 204 includes a modulator and demodulator as well as one or more buffers and filters, that are configured to generate and receive signals via antenna 221 and/or antenna 222.

In various embodiments, system 200 further includes processing device 224 which may include logic implemented using processing elements and/or one or more processor cores. Accordingly, processing device 224 includes one or more processing devices comprising processing elements that are configured to determine transmission parameters used for transmission operations performed by transceiver 204. More specifically, processing device 224 is configured to obtain temperature measurements from one or more components of system 200, such as transceiver 204, and also configured to determine a duty cycle used for transmission by transceiver 204. It will be appreciated that temperature measurements may be received from any suitable component and associated thermal probe.

For example, processing device 224 may be configured to receive temperature measurements from temperature sensor 226 which may be a hardware sensor that may include a thermal probe configured to periodically obtain temperature measurements and report such measurements to processing device 224. It will be appreciated that temperature sensor 226 may be implemented within transceiver 204 or within processing device 224. Moreover, temperature sensor 226 may be implemented within a single integrated package, such as integrated circuit 220, or separately from integrated circuit 220 and communicatively coupled to components of integrated circuit 220. Furthermore, wireless device 201 may include multiple temperature sensors that may collectively provide measurement data. In such an example, a composite temperature measurement may be made based on an average of temperature measurements or a weighted average. In such an example, weights may be determined by an entity, such as a manufacturer, and may be determined based on device parameters, such as a type of component. For example, a temperature measurement from temperature sensor within transceiver 204 may be weighted more greatly than other temperature measurement sensors.

Moreover, processing device 224 includes one or more components configured to implement a medium access control (MAC) layer that is configured to control hardware associated with a wireless transmission medium, such as that associated with a Wi-Fi transmission medium. In one example, processing device 224 may include processor core block 210 that may be configured to implement a driver, such as a Wi-Fi driver. Processing device 224 may further include digital signal processor (DSP) core block 212 which may be configured to include microcode.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless device 201 may include multiple RF circuits. Accordingly, each of multiple antennas may have its own RF circuit.

System 200 includes memory system 208 which is configured to store one or more data values associated with transmission parameter determination operations discussed above and in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204 and processing device 224 may be implemented on the same integrated circuit chip, such as integrated circuit chip 220. In another example, transceiver 204 and processing device 224 may each be implemented on their own chip, and thus may be disposed separately as a multi-chip module or on a common substrate such as a printed circuit board (PCB) or a single integrated package that includes multiple dies. It will also be appreciated that components of system 200 may be implemented in the context of a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
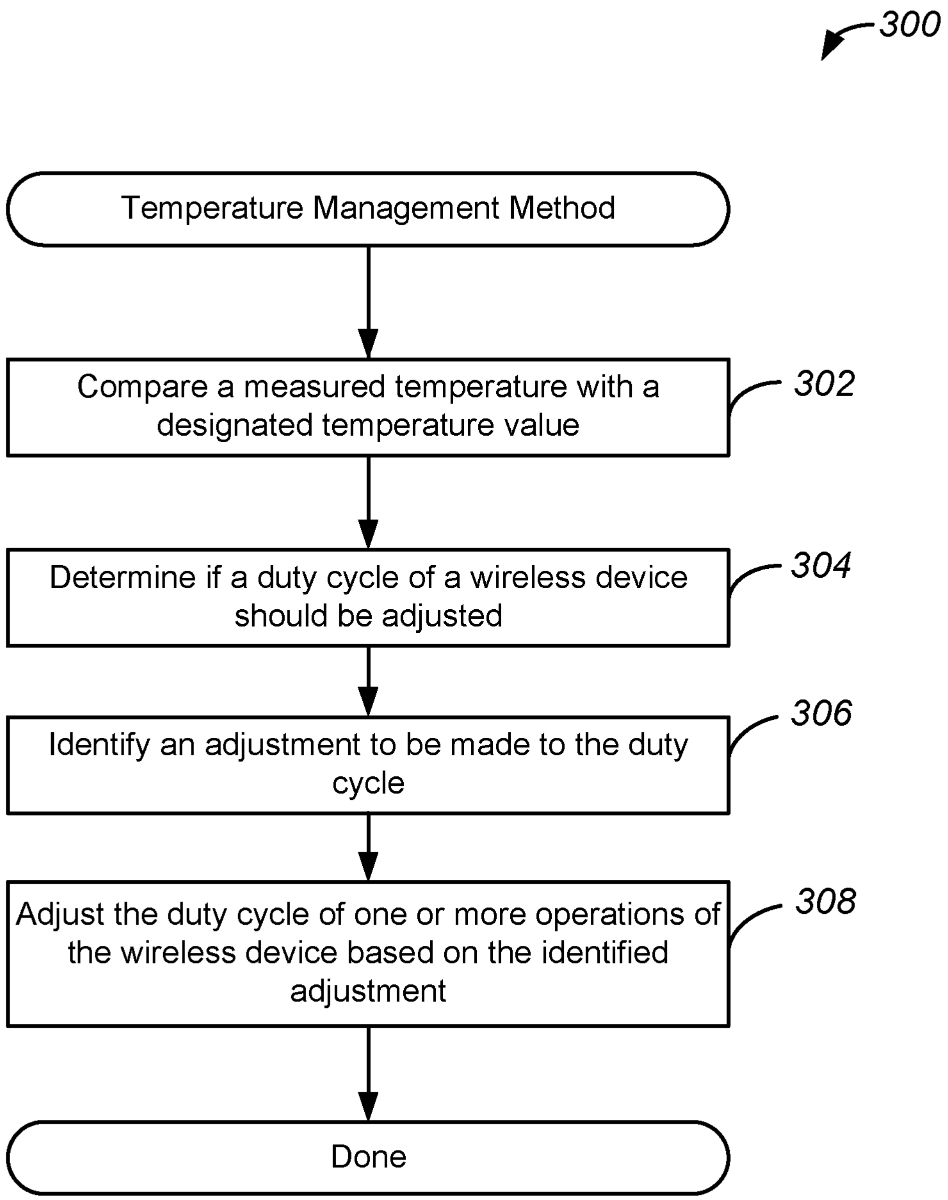
FIG. 3 illustrates an example of a method for temperature management, performed in accordance with some embodiments.

FIG. 3 illustrates an example of a method for temperature management, performed in accordance with some embodiments. As similarly discussed above, wireless devices may be implemented in a variety of contexts and operational environments which may experience high ambient temperatures. For example, an automotive environment may exceed 105° Celsius. Such operational conditions may affect a performance of wireless devices implemented in such environments. Accordingly, methods disclosed herein, such as method 300, may be performed to dynamically modify transmission parameters of such wireless devices to manage their temperature and performance when in such demanding operational environments.

Method 300 may perform operation 302 during which a measured temperature may be compared against a designated temperature value. Accordingly, one or more temperature measurements may be received from one or more components of a wireless device. For example, the temperature measurement may be received from a thermal probe embedded within a processing device or transceiver, or may be received from a thermal probe located in a different portion of an operational environment. The temperature measurement may be compared against a designated temperature value which may be a threshold temperature value determined by an entity, such as a manufacturer.

Method 300 may perform operation 304 during which it may be determined if a duty cycle of a wireless device should be adjusted. Accordingly, based on the comparison of the measured temperature with the designated temperature value, it may be determined if one or more transmission parameters, such as a duty cycle, should be adjusted. In one example, if the measured temperature exceeds the designated temperature value, it may be determined that a duty cycle should be adjusted.

Method 300 may perform operation 306 during which an adjustment to be made to the duty cycle may be identified. In various embodiments, an adjustment in the duty cycle, such as a decrease in the duty cycle, may be identified. As will be discussed in greater detail below, the adjustment may be identified based on the comparison of the measured temperature with the designated temperature value, and a specific adjustment mode may be identified.

Method 300 may perform operation 308 during which the duty cycle of one or more operations of the wireless device may be adjusted based on the identified adjustment. Accordingly, based on the identified adjustment mode, the wireless device may modify a duty cycle used for transmission, and a subsequent data transmission may use the adjusted duty cycle.

Figure 4:
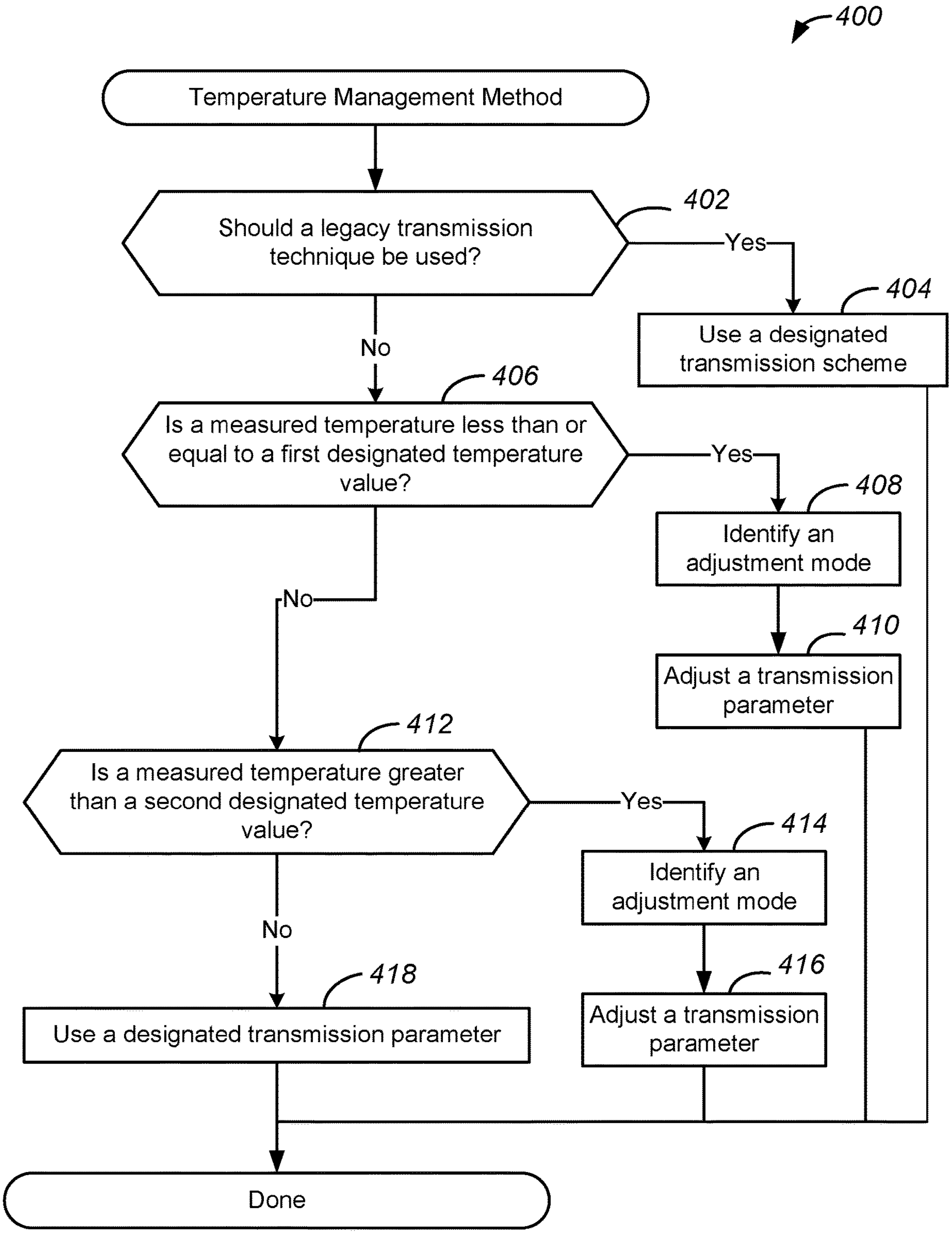
FIG. 4 illustrates another example of a method for temperature management, performed in accordance with some embodiments.

FIG. 4 illustrates another example of a method for temperature management, performed in accordance with some embodiments. As similarly discussed above, wireless devices may be implemented in a variety of contexts and operational environments which may experience high ambient temperatures. Accordingly, methods disclosed herein, such as method 400, may be performed to dynamically modify transmission parameters of such wireless devices to manage their temperature and performance when in such demanding operational environments. As will be discussed in greater detail below, one or more adjustment modes may be used to implement such modifications.

Method 400 may perform operation 402 during which it may be determined if a legacy transmission technique should be used. Such a determination may be made based on one or more status identifiers or flags. For example, a flag or status identifier may have been set by an entity, such as a user or manufacturer. In another example, such a flag or status identifier may be generated based on a system status, such as whether or not a temperature measurement is available. Accordingly, the status of the flag or status identifier may provide a positive or negative indication as to whether or not a legacy transmission technique should be used.

If it is determined that a legacy transmission technique should be used, method 400 may proceed to operation 404 during which a designated transmission scheme may be used for data transmission. The designated transmission scheme may be an existing predetermined scheme that includes no transmission parameter modification and uses a previous set of transmission parameters. As will be discussed in greater detail below, such transmission parameters may include a transmission duty cycle parameter. However, if it is determined that a legacy transmission technique should not be used, method 400 may proceed to operation 406.

Accordingly, during operation 406 it may be determined if a measured temperature is less than or equal to a first designated temperature value. Such a determination may be made based on a comparison of a received temperature measurement with a first designated temperature value. In various embodiments, the first designated temperature value may be determined based on a threshold temperature value which may represent a target operational temperature for one or more components of the wireless device. Such a target operational temperature may be determined by an entity, such as a manufacturer, and may be stored in memory during a manufacturing and/or configuration process. In some embodiments, the first designated temperature value may be determined based on the target operational temperature minus a hysteresis value.

In various embodiments, the hysteresis value may be set to an initial value, as may be determined by an entity, such as a manufacturer or a user. Such a hysteresis value may have been determined based on testing during a design process. In one example, the hysteresis value may be set to "1", and may have been selected based on data throughput testing with different hysteresis values during the design process. With a hysteresis value set at "1", if a measured temperature is 1 degree Celsius beneath a threshold value, a duty cycle may be increased, as will be discussed in greater detail below.

If it is determined that the measured temperature is less than or equal to a first designated temperature value, method 400 may perform operation 408 during which an adjustment mode may be identified. As will be discussed in greater detail below with reference to FIG. 5, a transmission parameter, such as a transmission duty cycle, of a transceiver of the wireless device may be adjusted in accordance with one or more adjustment modes. In one example, the transmission duty cycle may be increased, thus increasing an operational temperature to converge at the threshold temperature value. Moreover, the adjustment mode may determine a speed or rate at which such convergence occurs. Accordingly, during operation 408, a type of adjustment mode may be identified based on the comparison of the temperature measurement and the threshold temperature value minus a designated value, such as a step size, as will be discussed in greater detail below with reference to FIG. 5.

Method 400 may perform operation 410 during which a transmission parameter may be adjusted using the first adjustment mode. Accordingly, once the adjustment mode has been identified, an adjustment to the transmission parameter may be determined, and the transmission parameter may be adjusted based accordingly. In one example, the adjustment mode may identify an amount of an increase to a transmission duty cycle to be applied, and during operation 410, the transmission duty cycle of the transceiver may be increased by that amount.

Returning to operation 406, if it is determined that a measured temperature is not less than or equal to a first designated temperature value, method 400 may perform operation 412 during which it may be determined if a measured temperature is greater than a second designated temperature value. Such a determination may be made based on a comparison of a received temperature measurement with a second designated temperature value. In various embodiments, the second designated temperature value may be determined based on a threshold temperature value which may represent a target operational temperature for one or more components of the wireless device. In some embodiments, the second designated temperature value is determined to be the same as the target operational temperature.

If it is determined that a measured temperature is greater than a second designated temperature value, method 400 may perform operation 414 during which an adjustment mode may be identified. As will be discussed in greater detail below with reference to FIG. 6, a transmission parameter, such as a transmission duty cycle, of a transceiver of the wireless device may be adjusted in accordance with one or more adjustment modes. In one example, the transmission duty cycle may be decreased, thus decreasing an operational temperature to converge at the threshold temperature value. Moreover, the adjustment mode may determine a speed or rate at which such convergence occurs. Accordingly, during operation 414, a type of adjustment mode may be identified based on the comparison of the temperature measurement and the threshold temperature value plus a designated value, such as a step size, as will be discussed in greater detail below with reference to FIG. 6.

Method 400 may perform operation 416 during which the transmission duty cycle may be adjusted using the second adjustment mode. Accordingly, once the adjustment mode has been identified, an adjustment to the transmission parameter may be determined, and the transmission parameter may be adjusted based accordingly. In one example, the adjustment mode may identify an amount of a decrease to a transmission duty cycle to be applied, and during operation 416, the transmission duty cycle of the transceiver may be decreased by that amount.

Returning to operation 412, if it is determined that a measured temperature is not greater than the second designated temperature value, method 400 may perform operation 418 during which a designated transmission parameter may be used. In various embodiments, the designated transmission parameter may be a previously stored transmission parameter. In one example, the designated transmission parameter may be a previously used transmission duty cycle. Accordingly, during operation 418, a previous transmission duty cycle may be used, and no change or adjustment may be applied.

Figure 5:
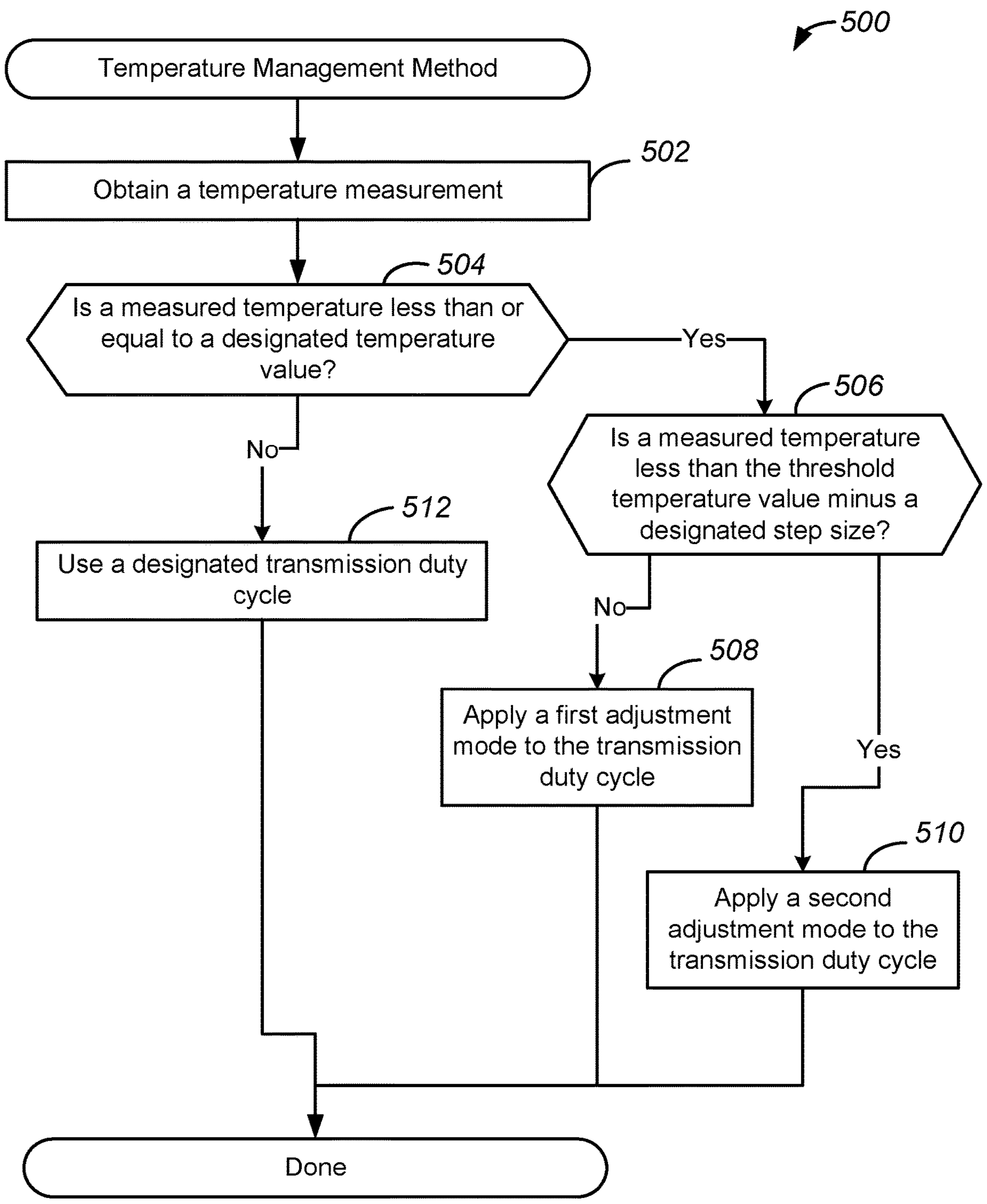
FIG. 5 illustrates an additional example of a method for temperature management, performed in accordance with some embodiments.

FIG. 5 illustrates an additional example of a method for temperature management, performed in accordance with some embodiments. As similarly discussed above, methods disclosed herein, such as method 500, may be performed to dynamically modify transmission parameters of wireless devices to manage their temperature and performance when in such demanding operational environments. As will be discussed in greater detail below, one or more adjustment modes may be used to increase a duty cycle of a data transmission.

Method 500 may perform operation 502 during which a temperature measurement may be obtained. As similarly discussed above, the temperature measurement may be received from one or more components of a wireless device, such as a temperature sensor included within a transceiver, or a temperature sensor located in another portion of the wireless device, such as a thermal probe included in an integrated chip package. In various embodiments, the temperature sensor may periodically make temperature measurements, and may periodically transmit the measurement data to one or more components, such as a processing device of the wireless device. As also discussed above, the temperature measurement may identify a current operational temperature of the wireless device.

Method 500 may perform operation 504 during which it may be determined if a measured temperature is less than or equal to a designated temperature value. As similarly discussed above, such a determination may be made based on a comparison of the received temperature measurement with a threshold temperature value minus some offset, such as a hysteresis value.

If it is determined that a measured temperature is less than or equal to the designated temperature value, method 500 may perform operation 506 during which it may be determined if a measured temperature is less than the threshold temperature value minus a designated step size. In various embodiments, the step size may be determined by an entity, such as a manufacturer or a user. Moreover, the step size may be configured to identify when fine scale adjustments or course scale adjustments should be applied to a transmission duty cycle. In this way, a difference between a measured temperature and a threshold temperature, which may also be a target operational temperature, may be used to determine a scale or scope of adjustment that should be applied to a transmission parameter, such as a transmission duty cycle.

In various embodiments, the step size may be defined using any suitable representation, such as a temperature value or a percentage value of a temperature. For example, a step size may be set at 3 degrees Celsius. The step size may be configured to determine when it is safe to use larger adjustments to a duty cycle without damaging a chip, and when smaller adjustments should be used. In various embodiments, such a step size may be determined by an entity, such as a manufacturer, during a design process. For example, and as will be discussed in greater detail below, if a measured temperature is 109 degrees C., a threshold temperature is 110 degrees C., and a step size is 3 degrees C., the determination of 109 being greater than 110 minus 3 may indicate fine adjustments should be made Accordingly, if it is determined that a measured temperature is not less than the threshold temperature value minus the designated step size, method 500 may perform operation 508 during which a first adjustment mode may be applied to a transmission duty cycle. In various embodiments, the first adjustment mode may be configured to apply fine scale adjustments that allow more precise adjustments to a transmission duty cycle. Accordingly, a temperature difference may be determined based on the threshold temperature value minus the temperature measurement. Moreover, a transmission duty cycle adjustment may be identified based on the temperature difference. An example of relationships between these values is show in equations 1-3 below:

$$T_{DIFF}=T_{TH}-T_{MEAS} \quad (1)$$

$$\text{BurstCount}=T_{DIFF} \quad (2)$$

$$TX_{DIFF}=\text{BurstCount} \quad (3)$$

As shown above in equations 1-3, $T_{DIFF}$ represents a difference between a threshold temperature value ($T_{TH}$) and a measured temperature ($T_{MEAS}$). This difference may be used to determine a burst count, which may then be used to determine a difference in a transmission parameter ($TX_{DIFF}$). In various embodiments, $TX_{DIFF}$ is interpreted by a processing device of the wireless device as a percentage, and thus is applied as a percentage increase in a transmission duty cycle of the wireless device.

Returning to operation 506, if it is determined that a measured temperature is less than the threshold temperature value minus a designated step size, method 500 may perform operation 510 during which a second adjustment mode may be applied to the transmission duty cycle. In various embodiments, the second adjustment mode may be configured to apply course scale adjustments that allow larger adjustments to the transmission duty cycle. Such larger adjustments may allow faster convergence upon the threshold temperature value.

As similarly discussed above, a temperature difference may be determined based on the threshold temperature value minus the temperature measurement. Moreover, a transmission duty cycle adjustment may be identified based on the temperature difference and a step size. An example of relationships between these values is shown in equations 4-6 below:

$$T_{DIFF}=T_{TH}-T_{MEAS} \quad (4)$$

$$\text{BurstCount}=T_{DIFF}/\text{StepSize} \quad (5)$$

$$TX_{DIFF}=\text{BurstCount}*10 \quad (6)$$

As shown above in equations 4-6, $T_{DIFF}$ represents a difference between a threshold temperature value ($T_{TH}$) and a measured temperature ($T_{MEAS}$). This difference may be divided by a step size to determine a burst count, which may then be used with a scaling factor to determine a difference in a transmission parameter ($TX_{DIFF}$). In one example, the scaling factor may be 10, but it will be appreciated that any suitable scaling factor may be used. In some embodiments, such a scaling factor may be determined dynamically and based on the size of $T_{DIFF}$. In various embodiments, $TX_{DIFF}$ is interpreted by a processing device of the wireless device as a percentage, and thus is applied as a percentage increase in a transmission duty cycle of the wireless device.

Returning to operation 504, if it is determined that a measured temperature is not less than or equal to a designated temperature value, method 500 may perform operation 512 during which a designated transmission duty cycle may be used. In various embodiments, the designated transmission duty cycle may be a previously used transmission duty cycle. Accordingly, during operation 512, a previous transmission duty cycle may be used, and no change or adjustment may be applied.

Figure 6:
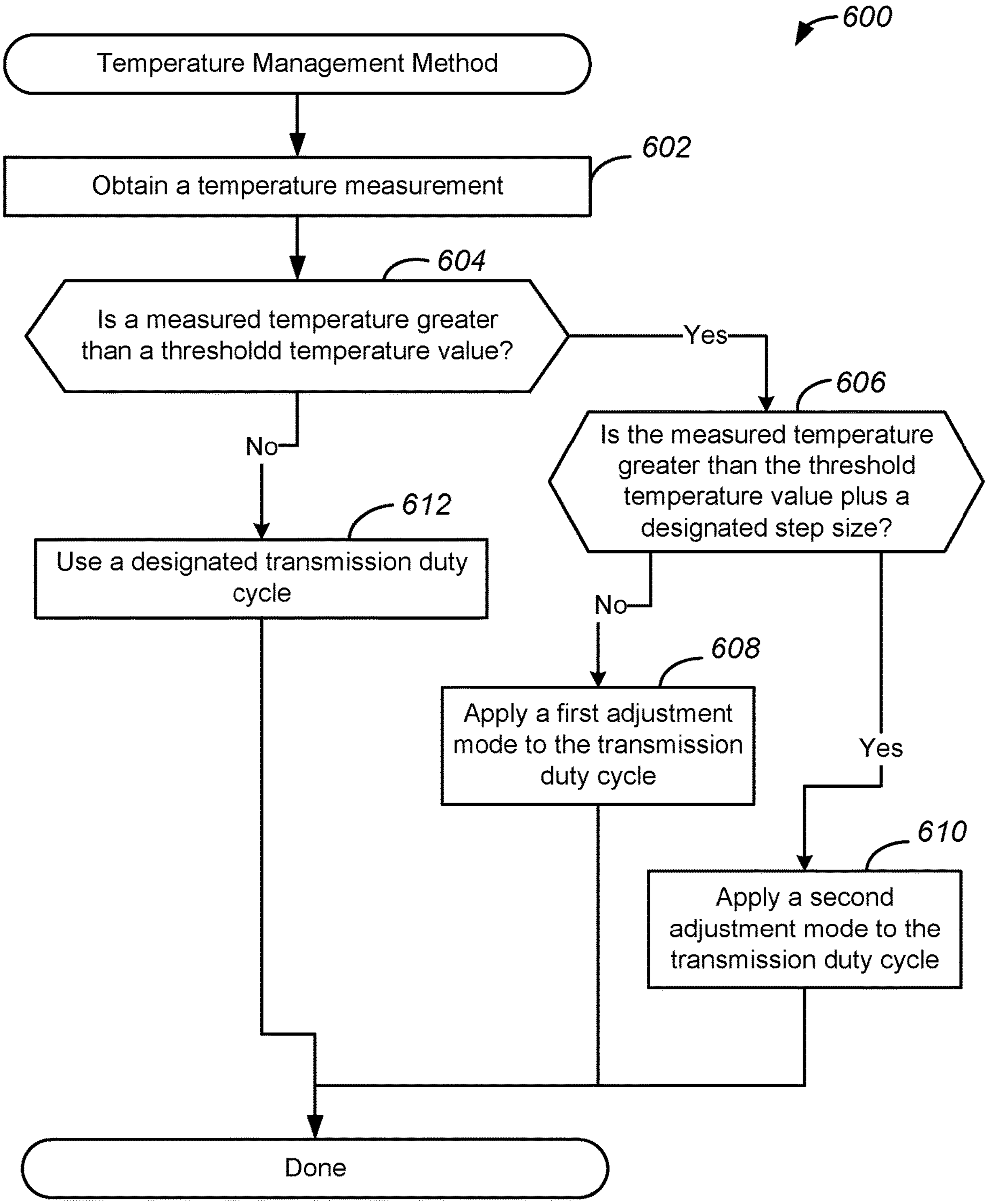
FIG. 6 illustrates another example of a method for temperature management, performed in accordance with some embodiments.

FIG. 6 illustrates another example of a method for temperature management, performed in accordance with some embodiments. As similarly discussed above, methods disclosed herein, such as method 600, may be performed to dynamically modify transmission parameters of wireless devices to manage their temperature and performance when in such demanding operational environments. As will be discussed in greater detail below, one or more adjustment modes may be used to decrease a duty cycle of a data transmission.

Method 600 may perform operation 602 during which a temperature measurement may be obtained. As similarly discussed above, the temperature measurement may be received from one or more components of a wireless device, such as a temperature sensor included within a transceiver, or a temperature sensor located in another portion of the wireless device, such as a thermal probe included in an integrated chip package. As also discussed above, the temperature measurement may identify a current operational temperature of the wireless device.

Method 600 may perform operation 604 during which it may be determined if a measured temperature is greater than a designated temperature value. As similarly discussed above, such a determination may be made based on a comparison of the received temperature measurement with a threshold temperature value.

If it is determined that the measured temperature is greater than the threshold temperature value, method 600 may perform operation 606 during which it may be determined if the measured temperature is greater than the threshold temperature value plus a designated step size. As similarly discussed above, the step size may be determined by an entity, such as a manufacturer or a user. Moreover, the step size may be configured to identify when fine scale adjustments or course scale adjustments should be applied to a transmission duty cycle. As similarly discussed above, the step size may be determined by an entity, such as a manufacturer, during a design process.

If it is determined that a measured temperature is not greater than the designated temperature value plus a designated step size, method 600 may perform operation 608 during which a first adjustment mode may be applied to a transmission duty cycle. In various embodiments, the first adjustment mode may be configured to apply fine scale adjustments that provide precise adjustments to a transmission duty cycle. Accordingly, a temperature difference may be determined based on the temperature measurement minus the threshold temperature value. Moreover, a transmission duty cycle adjustment may be identified based on the temperature difference. An example of relationships between these values is shown in equations 7-9 below:

$$T_{DIFF}=T_{MEAS}-T_{TH} \quad (7)$$

$$\text{BurstCount}=T_{DIFF} \quad (8)$$

$$TX_{DIFF}=\text{BurstCount} \quad (9)$$

As shown above in equations 7-9, $T_{DIFF}$ represents a difference between a measured temperature ($T_{MEAS}$) and a threshold temperature value ($T_{TH}$). This difference may be used to determine a burst count, which may then be used to determine a difference in a transmission parameter ($TX_{DIFF}$). As similarly discussed above, $TX_{DIFF}$ is interpreted by a processing device of the wireless device as a percentage, and thus is applied as a percentage decrease in a transmission duty cycle of the wireless device. In this way, the first adjustment mode may provide fine-scale decreases to the transmission duty cycle.

Returning to operation 606, if it is determined that a measured temperature is greater than the threshold temperature value plus a designated step size, method 600 may perform operation 610 during which a second adjustment mode may be applied to the transmission duty cycle. In various embodiments, the second adjustment mode may be configured to apply course scale adjustments that allow larger adjustments to the transmission duty cycle. As similarly discussed above, such larger adjustments may allow faster convergence upon the threshold temperature value.

In various embodiments, a temperature difference may be determined based on the temperature measurement minus the threshold temperature value. Moreover, a transmission duty cycle adjustment may be identified based on the temperature difference and a step size. An example of relationships between these values is shown in equations 10-12 below:

$$T_{DIFF}=T_{MEAS}-T_{TH} \tag{10}$$

$$\text{BurstCount}=T_{DIFF}/\text{StepSize} \tag{11}$$

$$TX_{DIFF}=\text{BurstCount}*10 \tag{12}$$

As shown above in equations 10-12, $T_{DIFF}$ represents a difference between a measured temperature ($T_{MEAS}$) and a threshold temperature value ($T_{TH}$). This difference may be divided by a step size to determine a burst count, which may then be used with a scaling factor to determine a difference in a transmission parameter ($TX_{DIFF}$). As similarly discussed above, the scaling factor may be 10, but it will be appreciated that any suitable scaling factor may be used. In various embodiments, $TX_{DIFF}$ is interpreted by a processing device of the wireless device as a percentage, and thus is applied as a percentage decrease in a transmission duty cycle of the wireless device. In this way, the second adjustment mode may provide course-scale decreases to the transmission duty cycle.

Returning to operation 604, if it is determined that a measured temperature is not greater than a designated temperature value, method 600 may perform operation 612 during which a designated transmission duty cycle may be used. In various embodiments, the designated transmission duty cycle may be a previously used transmission duty cycle. Accordingly, during operation 612, a previous transmission duty cycle may be used, and no change or adjustment may be applied.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

comparing, using a processing device, a measured temperature of a component of a wireless device with a designated temperature value;

determining, using the processing device, if a transmission parameter of the wireless device should be adjusted, the determining comprising determining that the measured temperature is a designated difference from the designated temperature value;

identifying, using the processing device, an adjustment to be made to the transmission parameter in response to determining that a transmission parameter should be adjusted; and adjusting, using the processing device, the transmission parameter of one or more transmission operations of the wireless device based on the identified adjustment.

2. The method of claim 1, wherein the transmission parameter is a transmission duty cycle.

3. The method of claim 2, wherein the identified adjustment comprises an adjustment to a percentage of the transmission duty cycle of the wireless device.

4. The method of claim 1, wherein the identifying of the adjustment further comprises: identifying an adjustment mode from a plurality of adjustment modes, and wherein the plurality of adjustment modes comprises a first adjustment mode and a second adjustment mode.

5. The method of claim 4, wherein the first adjustment mode comprises a percentage change to a transmission duty cycle determined based on a difference between the measured temperature and the designated temperature value, and wherein the second adjustment mode comprises the percentage change to the transmission duty cycle determined based on the difference between the measured temperature and the designated temperature value multiplied by a scaling factor.

6. The method of claim 5, wherein the identifying the adjustment comprises: identifying an increase in a transmission duty cycle in response to determining that the measured temperature is less than or equal to the designated temperature value.

7. The method of claim 6, wherein the first adjustment mode is identified in response to determining that the measured temperature is less than a threshold temperature value minus a designated step size.

8. The method of claim 5, wherein the identifying the adjustment comprises: identifying a decrease in a transmission duty cycle in response to determining that the measured temperature is greater than the designated temperature value.

9. The method of claim 8, wherein the first adjustment mode is identified in response to determining that the measured temperature is greater than a threshold temperature value.

10. A system comprising:

a transceiver configured to be compatible with a wireless communications protocol; and a processing device configured to:

compare a measured temperature of a component of a wireless device with a designated temperature value;

determine if a transmission parameter of the wireless device should be adjusted, the determining comprising determining that the measured temperature is a designated difference from the designated temperature value;

identify an adjustment to be made to the transmission parameter in response to determining that a transmission parameter should be adjusted; and adjust the transmission parameter of one or more transmission operations of the wireless device based on the identified adjustment.

11. The system of claim 10, wherein the transmission parameter is a transmission duty cycle, and wherein the identified adjustment comprises an adjustment to a percentage of the transmission duty cycle of the wireless device.

12. The system of claim 10, wherein the processing device is further configured to:

identify an adjustment mode from a plurality of adjustment modes, and wherein the plurality of adjustment modes comprises a first adjustment mode and a second adjustment mode.

13. The system of claim 12, wherein the first adjustment mode comprises a percentage change to a transmission duty cycle determined based on a difference between the measured temperature and the designated temperature value, and wherein the second adjustment mode comprises the percentage change to the transmission duty cycle determined based on the difference between the measured temperature and the designated temperature value multiplied by a scaling factor.

14. The system of claim 13, the processing device is further configured to: identify an increase in a transmission duty cycle in response to determining that the measured temperature is less than or equal to the designated temperature value.

15. The system of claim 13, the processing device is further configured to: Identify a decrease in a transmission duty cycle in response to determining that the measured temperature is greater than the designated temperature value.

16. A device comprising:

processing elements included in a wireless device configured to:

compare a measured temperature of a component of a wireless device with a designated temperature value;

determine if a transmission parameter of the wireless device should be adjusted, the determining comprising determining that the measured temperature is a designated difference from the designated temperature value;

identify an adjustment to be made to the transmission parameter in response to determining that a transmission parameter should be adjusted; and adjust the transmission parameter of one or more transmission operations of the wireless device based on the identified adjustment.

17. The device of claim 16, wherein the transmission parameter is a transmission duty cycle, and wherein the identified adjustment comprises an adjustment to a percentage of the transmission duty cycle of the wireless device.

18. The device of claim 16, wherein the processing elements are further configured to:

identify an adjustment mode from a plurality of adjustment modes, and wherein the plurality of adjustment modes comprises a first adjustment mode and a second adjustment mode, and wherein the first adjustment mode comprises a percentage change to a transmission duty cycle determined based on a difference between the measured temperature and the designated temperature value, and wherein the second adjustment mode comprises the percentage change to the transmission duty cycle determined based on the difference between the measured temperature and the designated temperature value multiplied by a scaling factor.

19. The device of claim 18, the processing elements are further configured to: identify an increase in a transmission duty cycle in response to determining that the measured temperature is less than or equal to the designated temperature value.

20. The device of claim 18, the processing elements are further configured to: Identify a decrease in a transmission duty cycle in response to determining that the measured temperature is greater than the designated temperature value.

* * * * *